United States Patent
Leabman et al.

(10) Patent No.: US 9,521,926 B1
(45) Date of Patent: Dec. 20, 2016

(54) WIRELESS ELECTRICAL TEMPERATURE REGULATOR FOR FOOD AND BEVERAGES

(71) Applicant: ENERGOUS CORPORATION, San Jose, CA (US)

(72) Inventors: Michael A. Leabman, San Ramon, CA (US); Gregory Scott Brewer, Livermore, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 14/586,016

(22) Filed: Dec. 30, 2014

Related U.S. Application Data

(63) Continuation-in-part of application No. 13/960,560, filed on Aug. 6, 2013, now abandoned.

(60) Provisional application No. 61/978,031, filed on Apr. 10, 2014.

(51) Int. Cl.
*A47J 36/24* (2006.01)

(52) U.S. Cl.
CPC ......... *A47J 36/2472* (2013.01); *A47J 36/2483* (2013.01)

(58) Field of Classification Search
CPC ... B23K 11/0073; B23K 26/26; B23K 26/422; B23K 26/702; B23K 31/02; B23K 2201/18; B23K 2203/04; A47J 19/027; A47J 39/24; A47J 27/21041; A47J 36/24; H04B 5/0025; H04B 5/0037; H05B 3/06
See application file for complete search history.

(56) References Cited

U.S. PATENT DOCUMENTS

| | | | |
|---|---|---|---|
| 4,360,741 | A | 11/1982 | Fitzsimmons et al. |
| 5,712,642 | A | 1/1998 | Hulderman |
| 5,936,527 | A | 8/1999 | Isaacman et al. |

(Continued)

FOREIGN PATENT DOCUMENTS

| | | |
|---|---|---|
| EP | 2545635 | 9/2011 |
| KR | 100755144 B1 | 9/2007 |

(Continued)

OTHER PUBLICATIONS

International Search Report dated Sep. 12, 2014 corresponding to International Patent Application No. PCT/US2014/037072, 3 pages.

(Continued)

*Primary Examiner* — Brian Jennison
(74) *Attorney, Agent, or Firm* — Eric L. Sophir; Dentons US LLP

(57) ABSTRACT

The present disclosure provides various methods, apparatus, and systems for wireless regulation of temperature of contents of a receptacle. The apparatus includes a receiver coupled to the receptacle, which receives pockets of energy generated in response to radio frequency waves. These radio frequency waves can be emitted by a pocket-forming transmitter in response to communication from the receptacle. The receiver coupled to the receptacle then provides electrical energy to a temperature regulating component associated with it. This temperature regulating component is configured to alter temperature of contents of the receptacle to desired temperature. Also disclosed is a cup containing liquids, such as beverages, which may be controllably heated to, or maintained at, a desired temperature using wireless power transmission.

18 Claims, 5 Drawing Sheets

(56) References Cited

U.S. PATENT DOCUMENTS

| | | |
|---|---|---|
| 5,982,139 A | 11/1999 | Parise |
| 6,127,799 A | 10/2000 | Krishnan |
| 6,127,942 A | 10/2000 | Welle |
| 6,289,237 B1 | 9/2001 | Mickle et al. |
| 6,615,074 B2 | 9/2003 | Mickle et al. |
| 6,798,716 B1 | 9/2004 | Charych |
| 6,856,291 B2 | 2/2005 | Mickle et al. |
| 6,960,968 B2 | 11/2005 | Odendaal et al. |
| 7,003,350 B2 | 2/2006 | Denker et al. |
| 7,027,311 B2 | 4/2006 | Vanderelli et al. |
| 7,068,991 B2 | 6/2006 | Parise |
| 7,191,013 B1 | 3/2007 | Miranda et al. |
| 7,403,803 B2 | 7/2008 | Mickle et al. |
| 7,451,839 B2 | 11/2008 | Perlman |
| 7,639,994 B2 | 12/2009 | Greene et al. |
| 7,643,312 B2 | 1/2010 | Vanderelli et al. |
| 7,786,419 B2 | 8/2010 | Hyde et al. |
| 7,812,771 B2 | 10/2010 | Greene et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,925,308 B2 | 4/2011 | Greene et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,380,255 B2 | 2/2013 | Shearer et al. |
| 8,410,953 B2 | 4/2013 | Zeine |
| 8,432,062 B2 | 4/2013 | Greene et al. |
| 8,446,248 B2 | 5/2013 | Zeine |
| 8,447,234 B2 | 5/2013 | Cook et al. |
| 8,461,817 B2 | 6/2013 | Martin et al. |
| 8,558,661 B2 | 10/2013 | Zeine |
| 8,621,245 B2 | 12/2013 | Shearer et al. |
| 8,854,176 B2 | 10/2014 | Zeine |
| 8,897,770 B1 | 11/2014 | Frolov et al. |
| 9,000,616 B2 | 4/2015 | Greene et al. |
| 9,021,277 B2 | 4/2015 | Shearer et al. |
| 9,124,125 B2 | 9/2015 | Leabman |
| 2005/0007276 A1 | 1/2005 | Barrick et al. |
| 2006/0238365 A1 | 10/2006 | Vecchione et al. |
| 2006/0284593 A1 | 12/2006 | Nagy et al. |
| 2007/0007821 A1 | 1/2007 | Rossetti |
| 2007/0060185 A1 | 3/2007 | Simon et al. |
| 2007/0178945 A1 | 8/2007 | Cook et al. |
| 2007/0191075 A1 | 8/2007 | Greene et al. |
| 2008/0309452 A1 | 12/2008 | Zeine |
| 2009/0200985 A1 | 8/2009 | Zane et al. |
| 2009/0243397 A1 | 10/2009 | Cook et al. |
| 2010/0027379 A1 | 2/2010 | Saulnier et al. |
| 2010/0033021 A1 | 2/2010 | Bennett |
| 2010/0194206 A1 | 8/2010 | Burdo et al. |
| 2010/0201201 A1 | 8/2010 | Mobarhan et al. |
| 2010/0244576 A1 | 9/2010 | Hillan et al. |
| 2010/0295372 A1 | 11/2010 | Hyde et al. |
| 2010/0309079 A1 | 12/2010 | Rofougaran et al. |
| 2010/0315045 A1 | 12/2010 | Zeine |
| 2011/0043047 A1 | 2/2011 | Karalis |
| 2011/0056215 A1 | 3/2011 | Ham et al. |
| 2011/0074342 A1 | 3/2011 | MacLaughlin |
| 2011/0115303 A1 | 5/2011 | Baarman et al. |
| 2011/0163128 A1* | 7/2011 | Taguchi ............... B67D 1/0869 222/146.6 |
| 2011/0181120 A1 | 7/2011 | Liu et al. |
| 2011/0254503 A1 | 10/2011 | Widmer et al. |
| 2011/0278941 A1 | 11/2011 | Krishna et al. |
| 2011/0281535 A1 | 11/2011 | Low et al. |
| 2011/0282415 A1 | 11/2011 | Eckhoff et al. |
| 2012/0080957 A1 | 4/2012 | Cooper et al. |
| 2012/0103562 A1* | 5/2012 | Alexander ............... F25B 29/00 165/64 |
| 2012/0146576 A1 | 6/2012 | Partovi |
| 2012/0157019 A1 | 6/2012 | Li |
| 2012/0193999 A1* | 8/2012 | Zeine ............... H02J 5/005 307/104 |
| 2012/0248891 A1 | 10/2012 | Drennen |
| 2012/0274154 A1 | 11/2012 | DeLuca |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0326660 A1 | 12/2012 | Lu et al. |
| 2013/0024059 A1 | 1/2013 | Miller et al. |
| 2013/0026982 A1 | 1/2013 | Rothenbaum |
| 2013/0200064 A1* | 8/2013 | Alexander ............... A47G 19/2288 219/441 |
| 2013/0207604 A1 | 8/2013 | Zeine |
| 2013/0241468 A1 | 9/2013 | Moshfeghi |
| 2013/0241474 A1 | 9/2013 | Moshfeghi |
| 2014/0008992 A1 | 1/2014 | Leabman |
| 2014/0008993 A1 | 1/2014 | Leabman |
| 2014/0035524 A1 | 2/2014 | Zeine |
| 2014/0049422 A1 | 2/2014 | Von Novak et al. |
| 2014/0062395 A1 | 3/2014 | Kwon et al. |
| 2014/0217967 A1 | 8/2014 | Zeine et al. |
| 2014/0241231 A1 | 8/2014 | Zeine |
| 2014/0265725 A1 | 9/2014 | Angle et al. |
| 2014/0265727 A1 | 9/2014 | Berte |
| 2014/0265943 A1 | 9/2014 | Angle et al. |
| 2014/0281655 A1 | 9/2014 | Angle et al. |
| 2014/0354063 A1 | 12/2014 | Leabman et al. |
| 2014/0354221 A1 | 12/2014 | Leabman et al. |
| 2014/0368048 A1 | 12/2014 | Leabman et al. |
| 2014/0375255 A1 | 12/2014 | Leabman et al. |
| 2015/0015194 A1 | 1/2015 | Leabman et al. |
| 2015/0015195 A1 | 1/2015 | Leabman et al. |
| 2015/0022010 A1 | 1/2015 | Leabman et al. |
| 2015/0102681 A1 | 4/2015 | Leabman et al. |
| 2015/0102769 A1 | 4/2015 | Leabman et al. |
| 2015/0130285 A1 | 5/2015 | Leabman et al. |
| 2015/0199665 A1 | 7/2015 | Chu |

FOREIGN PATENT DOCUMENTS

| | | |
|---|---|---|
| KR | 1020130026977 A | 3/2013 |
| WO | 9952173 A2 | 10/1999 |
| WO | 2004077550 A1 | 9/2004 |
| WO | 03091943 A1 | 11/2006 |
| WO | 2006122783 A | 11/2006 |
| WO | 2008156571 A2 | 12/2008 |
| WO | 2010022181 A1 | 2/2010 |
| WO | 2011112022 A2 | 9/2011 |
| WO | 2013035190 A1 | 3/2013 |

OTHER PUBLICATIONS

International Search Report dated Jan. 27, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
International Search Report dated Nov. 18, 2014 corresponding to International Patent Application No. PCT/US2014/049673, 5 pages.
Written Opinion of the International Searching Authority dated Nov. 18, 2014 corresponding to International Patent Application No. PCT/US2014/049673, 5 pages.

* cited by examiner

WIRELESS ELECTRICAL TEMPERATURE REGULATOR FOR FOOD AND BEVERAGES

CROSS-REFERENCES TO RELATED APPLICATIONS

This application is a non-provisional patent application claiming the benefit of U.S. Provisional Patent Application Ser. No. 61/978,031, filed Apr. 10, 2014, entitled "METHODS AND SYSTEMS FOR MAXIMUM POWER POINT TRANSFER IN RECEIVERS", which is incorporated by reference herein in its entirety for all purposes. This application is a continuation-in-part of U.S. Non-Provisional patent application Ser. No. 13/960,560, filed on Aug. 6, 2013, entitled "WIRELESS ELECTRICAL TEMPERATURE REGULATOR FOR FOOD AND BEVERAGES", which is herein fully incorporated by reference in its entirety for all purposes.

This application is related to U.S. Non-Provisional patent application Ser. No. 13/925,469, filed on Jun. 24, 2013, entitled "Methodology for Multiple Pocket-Forming;" U.S. patent Non-Provisional application Ser. No. 13/946,082, filed on Jul. 19, 2013, entitled "Method for 3 Dimensional Pocket-forming;" U.S. Non-Provisional patent application Ser. No. 14/583,625, filed Dec. 27, 2014, entitled "Receivers for Wireless Power Transmission," U.S. Non-Provisional patent application Ser. No. 14/583,630, filed Dec. 27, 2014, entitled "Methodology for Pocket-Forming," U.S. Non-Provisional patent application Ser. No. 14/583,634, filed Dec. 27, 2014, entitled "Transmitters for Wireless Power Transmission," U.S. Non-Provisional patent application Ser. No. 14/583,640, filed Dec. 27, 2014, entitled "Methodology for Multiple Pocket-Forming," U.S. Non-Provisional patent application Ser. No. 14/583,641, filed Dec. 27, 2014, entitled "Wireless Power Transmission with Selective Range," and U.S. Non-Provisional patent application Ser. No. 14/583,643, filed Dec. 27, 2014, entitled "Method for 3 Dimensional Pocket-Forming," all of which are herein fully incorporated by reference in their entirety.

FIELD OF INVENTION

The present disclosure relates to an accessory for managing desired temperatures for consumable goods, such as beverages and food, and more particularly to an electric accessory using wireless power transmission to manage temperature in beverages and food.

BACKGROUND

Some foods or beverages when consumed are generally preferred hot. These foods and beverages may not be desirable once they have cooled off. The use of devices for heating and maintaining food and beverages at a desired temperature is known in the art. These devices typically include insulating elements to limit the rate of heat loss from heated food or liquids. However, some of these devices are generally not able to keep food or beverages hot for an extended period of time. Other devices may be able to keep food or beverages hot by applying a heat source; however, these devices may require a constant electric power source or a controlled flame in order to keep consumables at a desired temperature. Such devices may be tedious and may represent a burden to consumers. For example, a consumer may need to find available power sources, such as a power outlet in a wall to connect the device and provide a source of power. In another example, a flame may be used to heat food or beverages, but may be inconvenient, uncomfortable or hard to manage. Therefore, a need exists for a convenient and easy to implement device for maintaining food or beverages at desirable temperatures.

SUMMARY

Disclosed herein is a cup system whereby liquids, such as beverages, may be controllably heated to, or maintained at, a desired temperature using wireless power transmission. The system includes a cup coupled with a heating component that may induce heat into beverages. The heating component may receive electrical energy from a transmitter through a wireless receiver.

In another embodiment, a plate system is disclosed whereby foods may be controllably heated to or maintained at a desired temperature using wireless power transmission. The system includes a plate coupled with a heating component that may induce heat into food. The heating component may receive electrical energy from a transmitter through a wireless receiver.

Also disclosed herein is a method for wireless temperature regulation, comprising the steps of: emitting power RF waves from a transmitter generating pockets of energy through pocket-forming to converge in 3-d space; coupling receivers to a food or beverage receptacle; capturing the pockets of energy at the receivers; and powering or charging a heating or cooling regulating component connected to the receiver within the receptacle.

Numerous other aspects, features and benefits of the present disclosure may be made apparent from the following detailed description taken together with the drawing figures.

BRIEF DESCRIPTION OF THE DRAWINGS

Embodiments of the present disclosure are described by way of example with reference to the accompanying figures, which are schematic and are not intended to be drawn to scale. Unless indicated as representing prior art, the figures represent aspects of the present disclosure.

DETAILED DESCRIPTION

Figure 1:
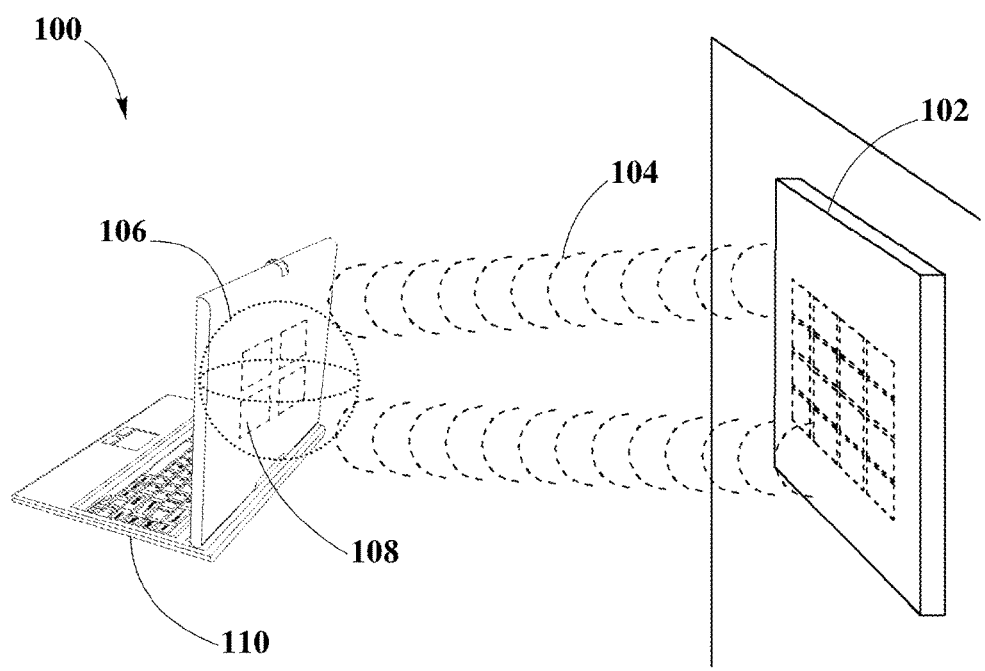
FIG. 1 illustrates wireless power transmission using pocket-forming, according to an embodiment.

"Pocket-forming" may refer to generating two or more RF waves which converge in 3-d space, forming controlled constructive and destructive interference patterns.

"Pockets of energy" may refer to areas or regions of space where energy or power may accumulate in the form of constructive interference patterns of RF waves.

"Null-space" may refer to areas or regions of space where pockets of energy do not form because of destructive interference patterns of RF waves.

"Transmitter" may refer to a device, including a chip which may generate two or more RF signals, at least one RF signal being phase shifted and gain adjusted with respect to other RF signals, substantially all of which pass through one or more RF antenna such that focused RF signals are directed to a target.

"Receiver" may refer to a device which may include at least one antenna, at least one rectifying circuit and at least one power converter for powering or charging an electronic device using RF waves.

"Adaptive pocket-forming" may refer to dynamically adjusting pocket-forming to regulate power on one or more targeted receivers.

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

FIG. 1 illustrates wireless power transmission 100 using pocket-forming. A transmitter 102 may transmit controlled Radio Frequency (RF) waves 104 which may converge in 3-d space. These RF waves may be controlled through phase and/or relative amplitude adjustments to form constructive and destructive interference patterns (pocket-forming). Pockets of energy 106 may form at constructive interference patterns and can be 3-dimensional in shape whereas nullspaces may be generated at destructive interference patterns. A receiver 108 may then utilize pockets of energy produced by pocket-forming for charging or powering an electronic device, for example, a laptop computer 110 and thus effectively providing wireless power transmission 100. In some embodiments, there can be multiple transmitters 102 and/or multiple receivers 108 for powering various electronic devices, for example, smartphones, tablets, music players, toys and others at the same time. In other embodiments, adaptive pocket-forming may be used to regulate power on electronic devices.

Figure 2:
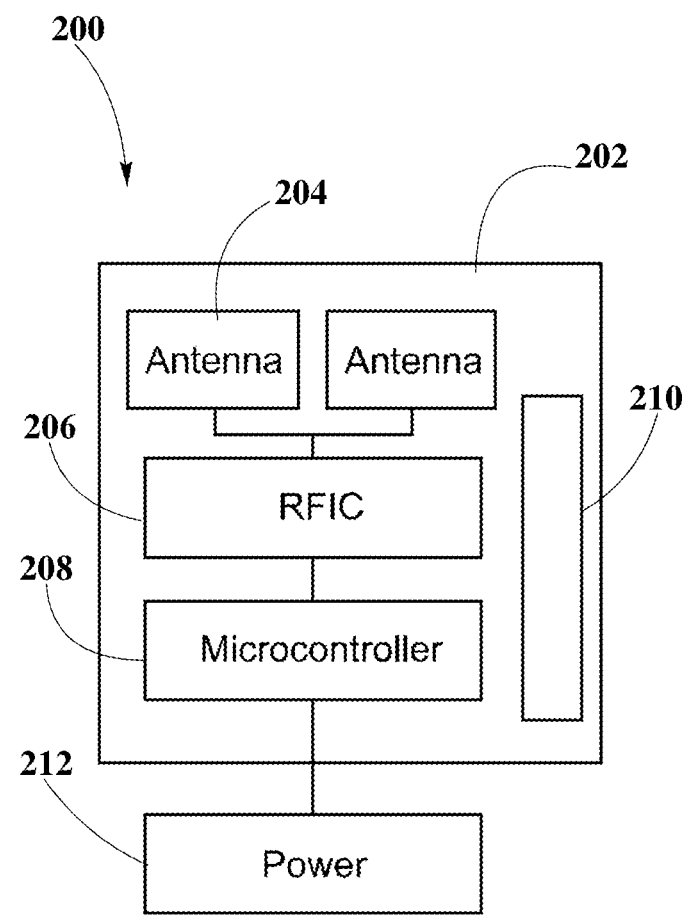
FIG. 2 illustrates a component level embodiment for a transmitter, according to an embodiment.

FIG. 2 illustrates a component level embodiment for a transmitter 200 which may be utilized to provide wireless power transmission 100 as described in FIG. 1. Transmitter 200 may include a housing 202 where at least two or more antenna elements 204, at least one RF Integrated Circuit (RFIC) 206, at least one digital signal processor (DSP) or micro-controller 208, and one optional communications component 210 may be included. Housing 202 can be made of any suitable material which may allow for signal or wave transmission and/or reception, for example, plastic or hard rubber. Antenna elements 204 may include suitable antenna types for operating in frequency bands such as 900 MHz, 2.5 GHz or 5.8 GHz as these frequency bands conform to Federal Communications Commission (FCC) regulations part 18 (Industrial, Scientific and Medical equipment). Antenna elements 204 may include vertical or horizontal polarization, right hand or left hand polarization, elliptical polarization, or other suitable polarizations as well as suitable polarization combinations. Suitable antenna types may include, for example, patch antennas with heights from about ⅛ inches to about 6 inch and widths from about ⅛ inches to about 6 inch. Other antenna elements 204 types can be used, for example meta-materials, dipole antennas among others. RFIC 206 may include a proprietary chip for adjusting phases and/or relative magnitudes of RF signals which may serve as inputs for antenna elements 204 for controlling pocket-forming. These RF signals may be produced using an external power supply 212 and a local oscillator chip (not shown) using a suitable piezoelectric material. Micro-controller 208 may then process information sent by a receiver through its own antenna elements for determining optimum times and locations for pocket-forming. In some embodiments, the foregoing may be achieved through communications component 210. Communications component 210 may be based on standard wireless communication protocols which may include Bluetooth, Wi-Fi or ZigBee. In addition, communications component 210 may be used to transfer other information such as an identifier for the device or user, battery level, location or other such information. Other communications component 210 may be possible which may include radar, infrared cameras or sound devices for sonic triangulation for determining the device's position.

Figure 3:
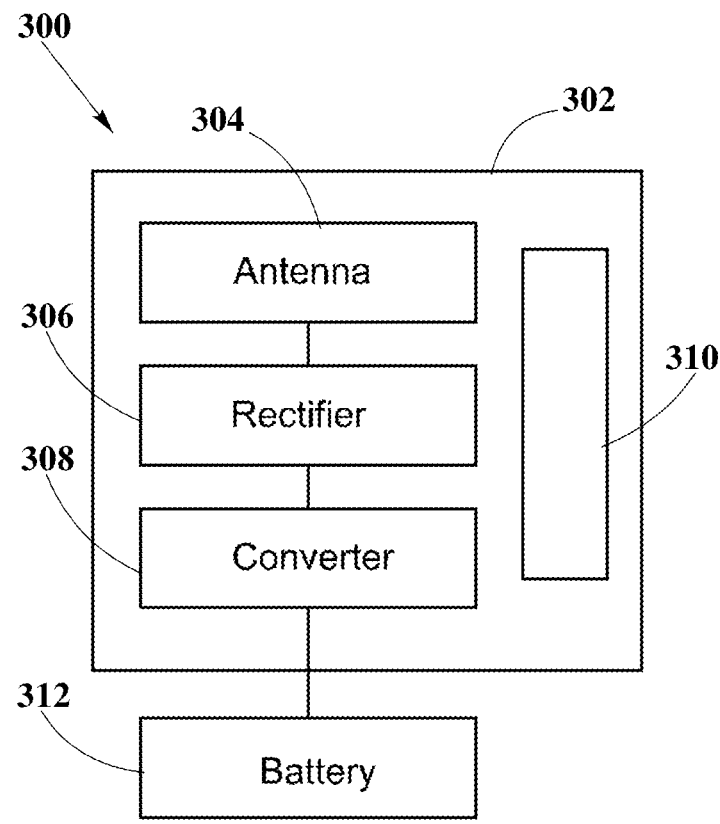
FIG. 3 illustrates a component level embodiment for a receiver, according to an embodiment.

FIG. 3 illustrates a component level embodiment for a receiver 300 which can be used for powering or charging an electronic device as exemplified in wireless power transmission 100. Receiver 300 may include a housing 302 where at least one antenna element 304, one rectifier 306, one power converter 308 and an optional communications component 310 may be included. Housing 302 can he made of any suitable material which may allow for signal or wave transmission and/or reception, for example plastic or hard rubber. Housing 302 may be an external hardware that may be added to different electronic equipment, for example in the form of cases, or can be embedded within electronic equipment as well. Antenna element 304 may include suitable antenna types for operating in frequency bands similar to the bands described for transmitter 200 from FIG. 2. Antenna element 304 may include vertical or horizontal polarization, right hand or left hand polarization, elliptical polarization, or other suitable polarizations as well as suitable polarization combinations. Using multiple polarizations can be beneficial in devices where there may not be a preferred orientation during usage or whose orientation may vary continuously through time, for example, a smartphone or portable gaming system. On the contrary, for devices with well-defined orientations, for example, a two-handed video game controller, there might be a preferred polarization for antennas which may dictate a ratio for the number of antennas of a given polarization. Suitable antenna types may include patch antennas with heights from about ⅛ inches to about 6 inch and widths from about ⅛ inches to about 6 inch. Patch antennas may have the advantage that polarization may depend on connectivity, i.e., depending on which side the patch is fed, the polarization may change. This may further prove advantageous as a receiver, such as receiver 300, may dynamically modify its antenna polarization to optimize wireless power transmission. Rectifier 306 may include diodes or resistors, inductors or capacitors to rectify the alternating current (AC) voltage generated by antenna element 304 to direct current (DC) voltage. Rectifier 306 may be placed as close as is technically possible to antenna element 304 to minimize losses. After rectifying AC voltage, DC voltage may be regulated using power converter 308. Power converter 308 can be a DC-DC converter which may help provide a constant voltage output, regardless of input, to an electronic device, or as in this embodiment to a battery 312. Typical voltage outputs can be from about 5 volts to about 10 volts. Lastly, communications component 310, similar to that of transmitter 200 from FIG. 2, may be included in receiver 300 to communicate with a transmitter or to other electronic equipment.

Figure 4:
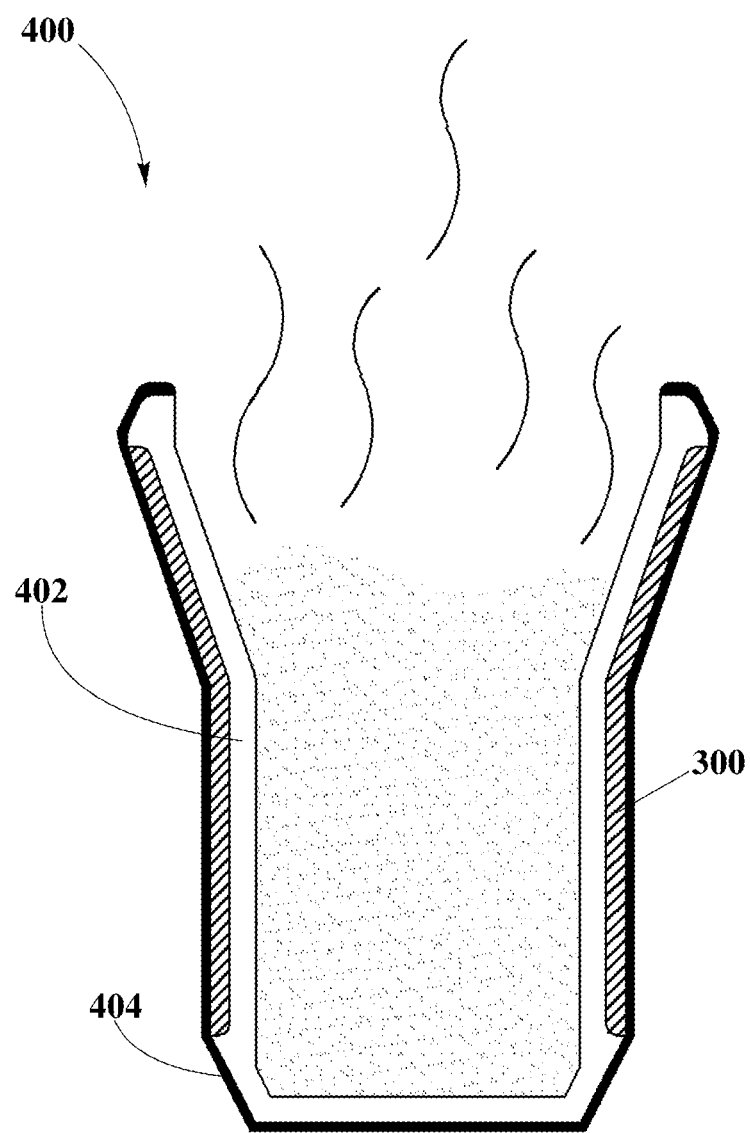
FIG. 4 illustrates an exemplary component of a temperature control cup adapted to a wireless power source receiver, according to an embodiment.

FIG. 4 is an example embodiment of a receiver 300 coupled with a cup 400. Cup 400 may include a temperature regulating component 402. For a cup 400 intended to keep a hot beverage warm, temperature regulating component 402 may include an electrical resistance which may dissipate electrical energy as heat which can then be induced into a hot beverage in order to maintain the beverage at a desired temperature. For a cup 400 intended to keep a beverage cold, temperature regulating component 402 may be a thermoelectric cooler which may operate by the Peltier effect. Other methods, such as gas expansion or magnetic cooling may be used as well. A receiver 300 may be used to provide electrical energy to temperature regulating component 402. Cup 400 may include an external layer 404 which may serve as a thermal insulator. Cup 400 may also contain additional control components such as an electrical switch for turning heat on and off or for regulating temperature. Cup 400 may include at least one or more receiver 300 components.

Cup 400 may also include a sensor that may determine the temperature of a beverage. Sensor information may then be sent by communications component 310 from receiver 300 to a transmitter 200. The information may then be analyzed by micro-controller 208 in order to adjust accordingly and transmit the appropriate amount of energy to the electrical resistor and subsequently transfer the energy as heat to temperature regulating component 402.

Figure 5:
FIG. 5 illustrates an exemplary component of a temperature control plate adapted to a wireless power source receiver, according to an embodiment.

FIG. 5 is another example embodiment of a receiver 300 coupled with a plate 500. Plate 500 may include a temperature regulating component 402. For a plate 500 intended to keep food warm, temperature regulating component 402 may include an electrical resistance which may dissipate electrical energy as heat which can then be induced into a food in order to maintain the food at a desired temperature. For a plate 500 intended to keep food cold, temperature regulating component 402 may be a thermoelectric cooler which may operate by the Peltier effect. Other methods, such as gas expansion or magnetic cooling may be used as well. A receiver 300 may be used to provide electrical energy to an electrical resistor (not shown in FIG. 5), which may in turn transfer it as heat to temperature regulating component 402. Plate 500 may include an external layer 404 which may serve as a thermal insulator. Plate 500 may also contain additional control components such as an electrical switch for turning heat on and off or for regulating temperature. Plate 500 may include at least one or more receiver 300 components.

Plate 500 may also include sensors that may determine the temperature of food. Sensor information may then be sent by communications component 210 to a transmitter 200. The information may then be analyzed by micro-controller 208 in order to adjust accordingly and transmit the appropriate amount of energy to the electrical resistor and subsequently transferred as heat to temperature regulating component 402.

In another embodiment, small rechargeable batteries such as those used in small watches may be included in electrical heaters as those described in FIG. 4 and FIG. 5. Batteries may be charged from pockets of energy 106 and may serve to power temperature regulating component 402 when out of range from a transmitter 200.

EXAMPLES

Example #1 is a coffee shop in which hot beverages are served using cups 400 described in FIG. 4. The cups 400 may be made of cheap materials, such as cardboard, for discardable purposes or made of more sophisticated materials like plastic or metal for reusable purposes. The coffee shop may have a wireless transmitter 200. Pockets of energy 106 may be formed by transmitter 200 and sent to receivers 300 in cups 400 that are within the scope of the wireless power transmission. Cups 400 may then apply heat to the beverages in order to keep them hot depending on the customers' preferences.

Example #2 is a restaurant in which food is served using plates 500 described in FIG. 5. Plates 500 may be made of cheap materials, such as cardboard, for discardable purposes or made of more sophisticated materials like plastic or metal for reusable purposes. The restaurant may have a wireless transmitter 200. Pockets of energy 106 may be formed by transmitter 200 and sent to receivers 300 in plates 500 that are within the scope of the wireless power transmission. Plates 500 may then apply heat in order to keep the food hot depending on the customers' preferences.

Example #3 is a Bar in which cold drinks are served using cups 400 described in FIG. 4. Cups 400 may be made of cheap materials, such as cardboard, for discardable purposes or made of more sophisticated materials like plastic, glass or metal for reusable purposes. The bar may have a wireless transmitter 200. Pockets of energy 106 may be formed by transmitter 200 and sent to receivers 300 in cups 400 that are within the scope of the wireless power transmission. Cups 400 may then cool drinks depending on the customers' preferences.

What is claimed is:

1. A method for wireless regulation of temperature of contents of a receptacle, comprising the steps of:
   receiving, by a wireless power receiver coupled to the receptacle, energy at a pocket of energy generated by constructive interference of a plurality of power waves emitted by a wireless power transmitter;
   providing, by the receiver coupled to the receptacle, electrical energy to a temperature regulating component associated with the receptacle, the temperature regulating component being configured to alter temperature of contents of the receptacle to a desired temperature;
   determining, by a sensor coupled to the receptacle, a temperature of the contents of the receptacle;
   transmitting, by a communications component of the receiver, a signal containing data indicating the temperature of the contents of the receptacle to the wireless power transmitter; and
   receiving, by the receiver, energy from an adjusted pocket of energy generated by the transmitter adjusting at least one of the plurality of power waves based upon the temperature of the contents of the receptacle.

2. The method for wireless regulation of temperature of contents of a receptacle of claim 1, further including the step of receiving, by the receiver, the temperature of the contents of the receptacle from the sensor coupled to the receptacle.

3. The method for wireless regulation of temperature of contents of a receptacle of claim 1, wherein the temperature regulating component comprises an electrical resistance heater configured to heat the contents of the receptacle.

4. The method for wireless regulation of temperature of contents of a receptacle of claim 1, wherein the receptacle is a cup configured to heat a beverage.

5. The method for wireless regulation of temperature of contents of a receptacle of claim 4, wherein the cup includes an external layer configured to maintain the temperature of the contents of the cup.

6. The method for wireless regulation of temperature of contents of a receptacle of claim 1, wherein the receptacle is a plate configured to heat food on the plate.

7. The method for wireless regulation of temperature of contents of a receptacle of claim 1, wherein the temperature regulating component comprises a thermoelectric cooler configured to cool the contents in the receptacle.

8. The method for wireless regulation of temperature of contents of a receptacle of claim 1, wherein the pocket of energy is regulated by utilizing adaptive pocket-forming.

9. The method for wireless regulation of temperature of contents of a receptacle of claim 1, wherein the communications component comprises one or more antennas of the receiver.

10. The method for wireless regulation of temperature of contents of a receptacle of claim 1, wherein the communications component uses standard wireless communication protocols selected from a group consisting of Bluetooth, Wi-Fi, ZigBee, and FM radio.

11. An apparatus for wireless regulation of temperature of contents of a receptacle, the apparatus comprising:
- a receptacle coupled to a sensor, a receiver, and a temperature regulating component that is configured to alter temperature of contents of the receptacle to desired temperature in response to electricity from the receiver;
- the sensor configured to determine the temperature of the contents of the receptacle and communicate the temperature of the contents of the receptacle to the receiver;
- the receiver comprising a communications component configured to transmit a signal containing data indicating the temperature of contents to a wireless power transmitter; and
- the receiver configured to receive energy from a pocket of energy and convert the received energy into electricity through one or more antennas and one or more rectifying circuits of the receiver, the pocket of energy being generated by constructive interference of a plurality of power waves emitted by a wireless power transmitter, the power waves being emitted based upon the temperature of the contents of the receptacle.

12. The apparatus for wireless regulation of temperature of contents of a receptacle of claim 11, further including an electrical switch connected to the receiver and configured to control supply of electricity to the temperature regulating component.

13. The apparatus for wireless regulation of temperature of contents of a receptacle of claim 11, wherein the temperature regulating component comprises an electrical resistance heater configured to heat the contents of the receptacle.

14. The apparatus for wireless regulation of temperature of contents of a receptacle of claim 11, wherein the temperature regulating component comprises a thermoelectric cooler configured to cool the contents of the receptacle.

15. The apparatus for wireless regulation of temperature of contents of a receptacle of claim 11, wherein the receptacle is a cup configured to heat a beverage.

16. The apparatus for wireless regulation of temperature of contents of a receptacle of claim 11, wherein the cup includes an external layer configured to serve as a thermal insulator.

17. The apparatus for wireless regulation of temperature of contents of a receptacle of claim 11, wherein the receptacle is a plate configured to heat food on the plate.

18. The apparatus for wireless regulation of temperature of contents of a receptacle of claim 11, wherein the pocket of energy is regulated by utilizing adaptive pocket-forming.

* * * * *